J. J. BUDLONG.
Manger.
No. 211,617.         Patented Jan. 28, 1879.
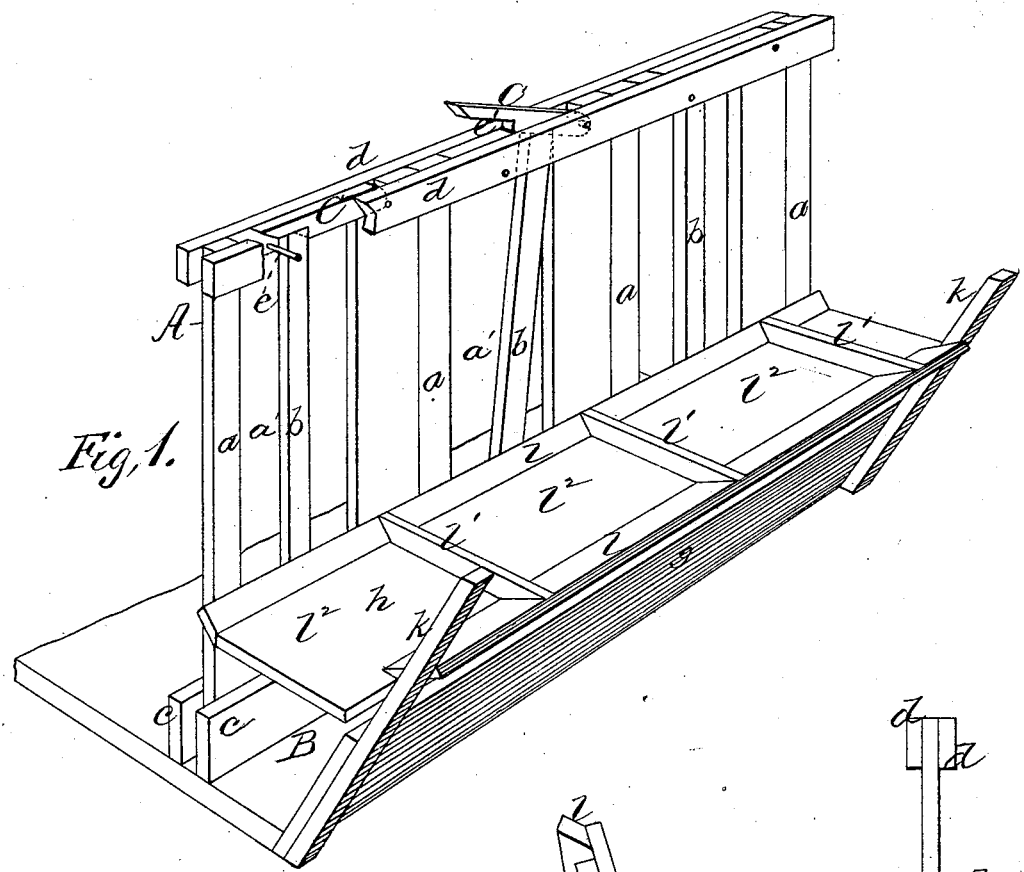
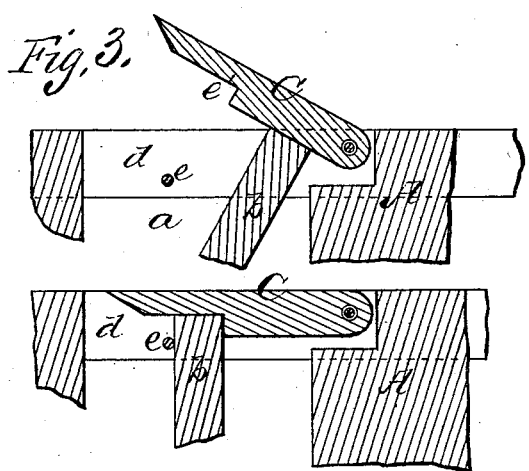
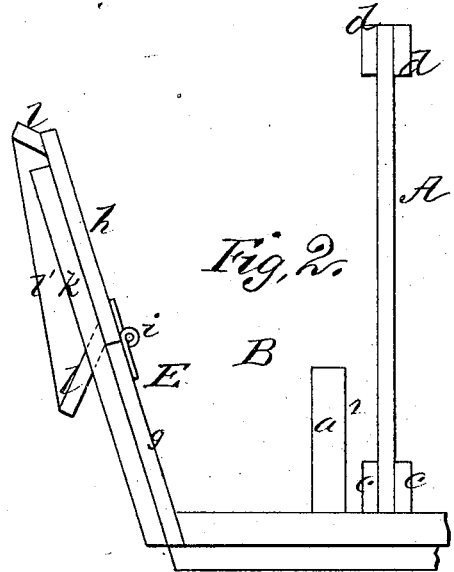
WITNESSES
Villette Anderson.
Francis J. Masi.
INVENTOR
Jerome J. Budlong,
by E. W. Anderson.
ATTORNEY

UNITED STATES PATENT OFFICE.

JEROME J. BUDLONG, OF OSWEGO, ILLINOIS.

IMPROVEMENT IN MANGERS.

Specification forming part of Letters Patent No. 211,617, dated January 28, 1879; application filed June 22, 1878.

*To all whom it may concern:*

Be it known that I, JEROME J. BUDLONG, of Oswego, in the county of Kendall and State of Illinois, have invented a new and valuable Improvement in a Manger; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of rear side of my improved manger. Fig. 2 is an end view thereof, and Fig. 3 is a representation of details.

This invention relates to an improved hay-manger and feed-box for horses and cattle; and it has for its object to provide a means for feeding either hay, fodder, vegetables, or liquid food to animals, as may be desired.

The nature of the invention consists in a combined stanchion and hay-manger, having its rear wall made in two sections hinged together, the lower section fixedly connected by its lower edge to the bottom plank of the manger, and the upper section carrying the supplemental feed-trough, as hereinafter shown and described.

In the annexed drawings, the letter A designates an upright wall composed of the fixed stanchions $a$ and the vibrating stanchions $b$, between which are the spaces $a^1$, the stanchions $a$ being connected at top and bottom by the parallel bars $c\,c$ and $d\,d$. The stanchions $b$ are pivoted at their lower ends between the bars $c\,c$, and have their upper ends extended up between the bars $d\,d$, as shown in Fig. 3, so that they vibrate in the length of the stanchion-wall A.

C indicates latches, pivoted at one end between the bars $c\,c$, and having upon their under sides each a notch, $e'$. These latches serve to lock the movable stanchion $b$ against vibration when in a vertical position against the stop-pin $e$; but when thrown up, as shown at the upper part of Fig. 3, the stanchion $b$ may be swung upon its pivot to enlarge spaces $a^1$ and admit the animal's head, to allow him to feed out of the manger B. The outside wall, E, of this manger is composed of two sections, $h\,g$, of which the latter is fixed to the bottom plank, and the former hinged to the section $g$, said section $g$ being provided with rests $k$, against which the section $h$ rests when in the position shown in Fig. 2. In this position the device is in condition for use as a hay or straw feeder.

The section $g$ is fixed at its lower edge to the bottom plank of the manger B, and the vibrating section $h$ has upon its outer side the raised longitudinal and transverse flanges $l\,l^1$, respectively, forming troughs $l^2$, out of which mashes vegetable and other similar food may be fed to the stock when the said section is swung inward upon its hinges toward the stanchion-wall A. In order to hold the troughs thus brought into use from undue downward movement, supporting-posts $a^2$ are erected near the stanchion-wall in the manger B, as shown in Fig. 2, resting upon which the said trough-section $h$ will be adequately supported.

I claim—

In a combined stanchion and hay-manger, the wall E, made in two sections, hinged together, as shown, and the lower section fixedly connected by its lower edge to the bottom plank of the manger, and the upper section carrying the supplemental feed-troughs $l^2$, substantially as specified.

In testimony that I claim the above I have hereunto subscribed my name in the presence of two witnesses.

JEROME J. BUDLONG.

Witnesses:
L. P. HOYT,
WILLIS HOYT.